US008042271B2

(12) United States Patent
Caprara et al.

(10) Patent No.: US 8,042,271 B2
(45) Date of Patent: Oct. 25, 2011

(54) ROLLER FOR TRANSFERRING LABELS AND RELATED METHOD

(75) Inventors: Alessandro Caprara, Isola della Scala (IT); James Frederick Robertson Carmichael, Kendal (GB)

(73) Assignee: Sidel Holdings & Technology SA, Pully, Geneva (CH)

( * ) Notice: Subject to any disclaimer, the term of this patent is extended or adjusted under 35 U.S.C. 154(b) by 1261 days.

(21) Appl. No.: 10/558,622

(22) PCT Filed: Dec. 29, 2003

(86) PCT No.: PCT/IT03/00859

§ 371 (c)(1),
(2), (4) Date: Mar. 12, 2007

(87) PCT Pub. No.: WO2004/108538

PCT Pub. Date: Dec. 16, 2004

(65) Prior Publication Data

US 2008/0029205 A1 Feb. 7, 2008

(30) Foreign Application Priority Data

Jun. 4, 2003 (IT) .............................. PR2003A0041

(51) Int. Cl.
*B23P 17/00* (2006.01)

(52) U.S. Cl. ............. 29/895.2; 492/28; 492/30; 492/48; 492/60; 156/235; 156/450; 156/458; 156/497; 156/578

(58) Field of Classification Search ................. 29/895.2; 492/28, 48, 60, 30; 156/235, 568
See application file for complete search history.

(56) References Cited

U.S. PATENT DOCUMENTS

| | | | | |
|---|---|---|---|---|
| 4,662,965 | A * | 5/1987 | DiFrank et al. | 156/215 |
| 4,671,843 | A * | 6/1987 | Olsen | 156/450 |
| 5,405,487 | A * | 4/1995 | Galchefski et al. | 156/566 |
| 6,044,887 | A * | 4/2000 | Orlandi et al. | 156/521 |
| 2002/0007919 | A1* | 1/2002 | Cavaggioni et al. | 156/556 |

FOREIGN PATENT DOCUMENTS

| | | | |
|---|---|---|---|
| EP | 0641717 | A2 | 3/1995 |
| EP | 0 872 424 | A2 | 10/1998 |
| JP | S47-25996 | U | 8/1972 |
| JP | S63-075334 | U | 5/1988 |
| JP | H07-069333 | A | 3/1995 |

* cited by examiner

*Primary Examiner* — Derris H Banks
*Assistant Examiner* — Azm Parvez
(74) *Attorney, Agent, or Firm* — Arent Fox LLP

(57) ABSTRACT

An aspirating roller (1) for transferring labels, comprising at least a pair of pads (20;21) projecting relative to a lateral surface (1*a*) of the roller (1). The roller (1) is characterised in that at least a portion of the lateral surface (1*a*) of the roller (1) present between the pads (20;21) is elastically deformable. A method for removing/mounting an elastically deformable plate-like element (6), of the type present between a pair of pads (20;21) and defining a lateral surface (1*a*) of a roller (1) for transferring labels.

11 Claims, 3 Drawing Sheets

ROLLER FOR TRANSFERRING LABELS AND RELATED METHOD

CROSS-REFERENCE TO RELATED APPLICATION

This application is a National Stage entry of International Application Number PCT/IT2003/000859, filed Dec. 29, 2003. The disclosure of the prior application is hereby incorporated herein in its entirety by reference.

TECHNICAL FIELD AND BACKGROUND ART

The present invention relates to a roller for transferring labels of the aspirating type, comprising at least a pair of pads projecting relative to a lateral surface of the roller, and a related method.

It is well known that rollers for transferring labels are used in labelling machines, in which a film of labels is unwound from a reel and is routed towards a cutting device, which cuts it to form the labels to be glued on a container.

The label thus formed always has substantially rectangular or square contour and it has two vertical and parallel edges.

The transfer roller, rotating at a predetermined speed about a normally vertical axis, picks up the label and transfers it in correspondence with gluing means and subsequently onto the container to be labelled.

Specifically, the gluing means lay a first strip of glue along a rear face of a first vertical edge of the label and subsequently lay a second strip of glue on a second vertical edge, which will be superposed and glued to the first edge. In accordance with a known variant, there are gluing means which are capable of laying the glue in points, instead of along one or more strips. The containers to be labelled are brought into contact with the roller for transferring the label by means of a linear or rotary transport, commonly called carrousel.

According to a first prior art technique, the transfer roller is provided with a group of pincers so shaped as to keep the label adherent to the lateral surface of the roller.

Such a transfer roller has the important drawback of being extremely complex to build, because it requires a system of cams, suitably dimensioned to open and close the pincers during the rotation of the roller. In the second place, a labelling machine provided with such a roller is not suitable for bottling plants with high production rates, because of the reduced velocities of rotation of the roller.

According to a second prior art technique, within a roller lacking pincers, a plurality of cavities communicating with a lateral surface of the roller by means of a series of through holes is obtained. Subsequently, through said cavities, a suction of variable and controlled intensity is taken in such a way that the labels can adhere to the lateral surface of the roller during their transfer from the cutting device to the container.

The lateral surface of the rollers is also provided with a plurality of recesses for collecting the residues of glue which tend to be deposited on the suction holes, m order not to compromise their operation. Said residues are caused by the contact between the label and the gluing means and their size in influenced by the velocity of rotation of the roller.

An aspirating transfer roller can be employed for labelling both containers made of plastic material, typically PET, and glass containers.

However, in this latter case, use of a roller of the aspirating type has the important drawback of causing the rupture of the containers, due to the contact, during the labelling operation, between the lateral surface of the roller and the containers.

The lateral surface of the roller is usually made of steel or otherwise of another material with high rigidity, suitable to allow an adequate relative sliding between the label and the roller, when transferring the label on the container.

Glass containers, which usually have very poor dimensional tolerances, considerably complicate the operations of setting up and correctly calibrating the labelling machine, and thus often come violently in contact with the transfer roller.

Consequently, since glass is a rigid, but extremely fragile material, the containers are unavoidably broken, with the inevitable escape of liquid and downtime of the machine for cleaning and maintenance, which leads to considerable productivity losses for the plant.

In the sector of PET containers, this problem is not encountered, since, although there is a contact between the containers and the lateral surface of the roller, the containers themselves absorb, becoming deformed, the forces the develop in the point of contact.

DISCLOSURE OF INVENTION

An object of the present invention is to eliminate the aforesaid drawbacks making available a roller for transferring labels of the aspirating type, which can be used for labelling containers made of glass, or other fragile material, and having poor dimensional tolerances.

In particular, an object of the present invention is to propose a roller that can be employed in each application in which it is indispensable to prevent mechanical deformations of the containers to be labelled.

Another object of the present invention is to provide a roller with a lateral surface that has adequate wear resistance and allows an efficient relative sliding between the label and the roller, when transferring the label on the container.

A further object is to achieve the aforesaid results in the context of a simple, rational and reliable constructive solution.

Said aims are fully achieved by the roller for transferring labels and by the related method, according to the present invention, which is characterised by the content of the appended claims and in particular in that at least a portion of the lateral surface of the roller between the pads is elastically deformable.

In particular, in the preferred embodiment said lateral elastically deformable surface is defined by at least a plate like element.

The method is characterised by the content of claims 14 and 15 set out below.

BRIEF DESCRIPTION OF DRAWINGS

These and other characteristics shall become more readily apparent from the following description of a preferred embodiment illustrated, purely by way of non limiting example, in the accompanying drawing tables, in which.

BEST MODE FOR CARRYING OUT THE INVENTION

Figure 1:
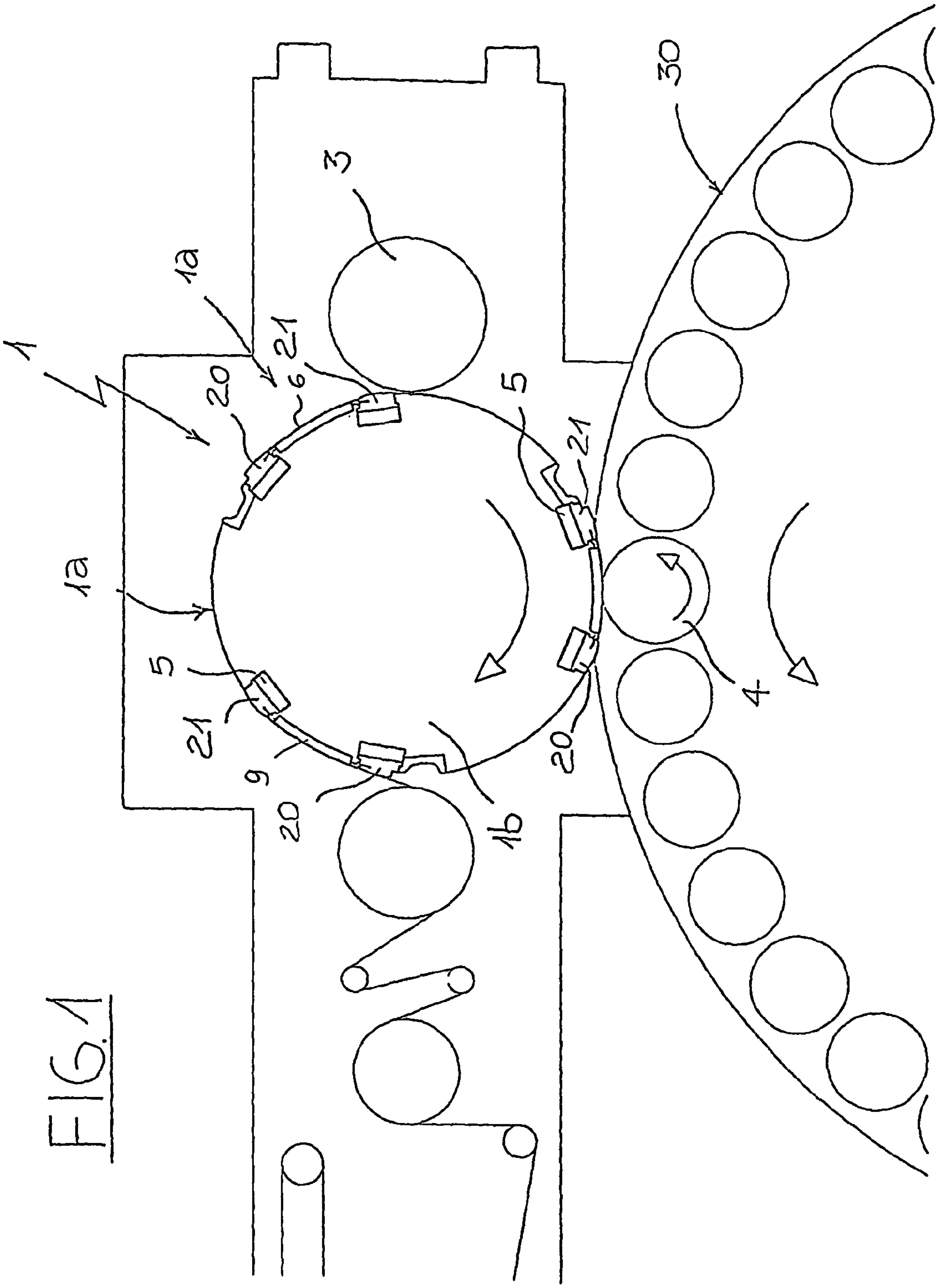
FIG. 1 shows a top schematic view of a labelling machine provided with a roller in accordance with the present invention.
Figure 2:
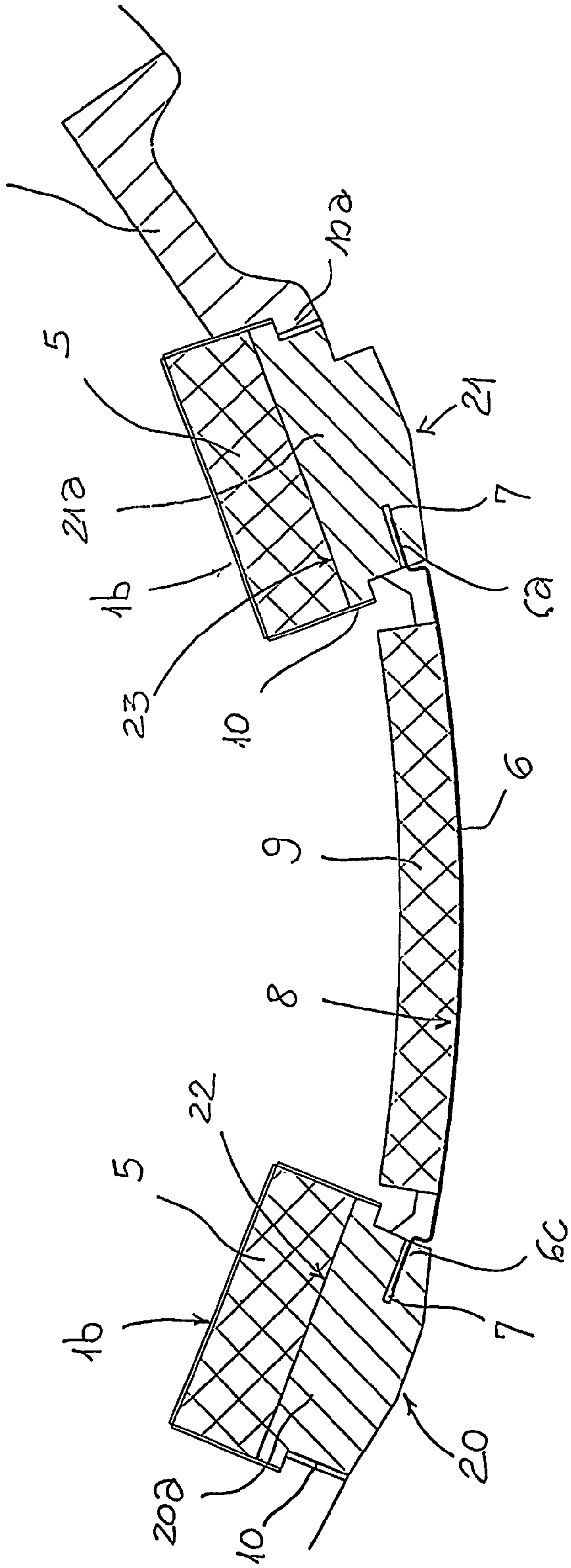
FIG. 2 shows a constructive detail of the roller shown in FIG. 1.
Figure 3:
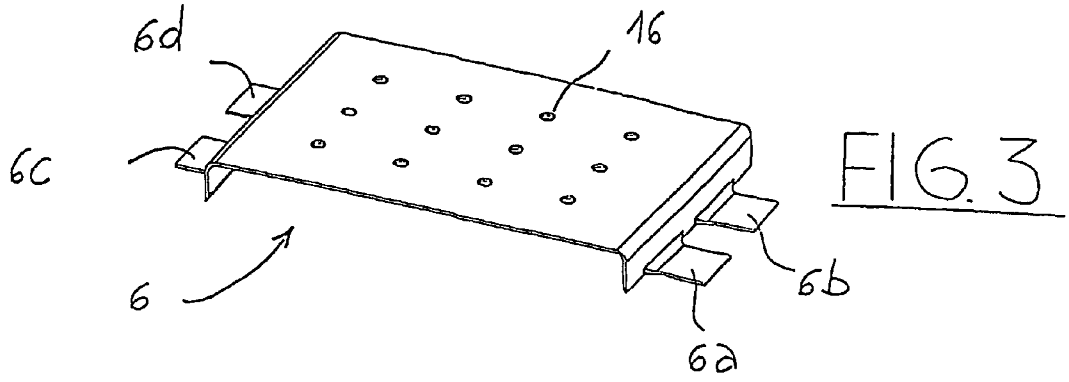
FIGS. 3 and 4 show two global axonometric views of a plate like element associated to the roller shown in the previous figures.
Figure 4:
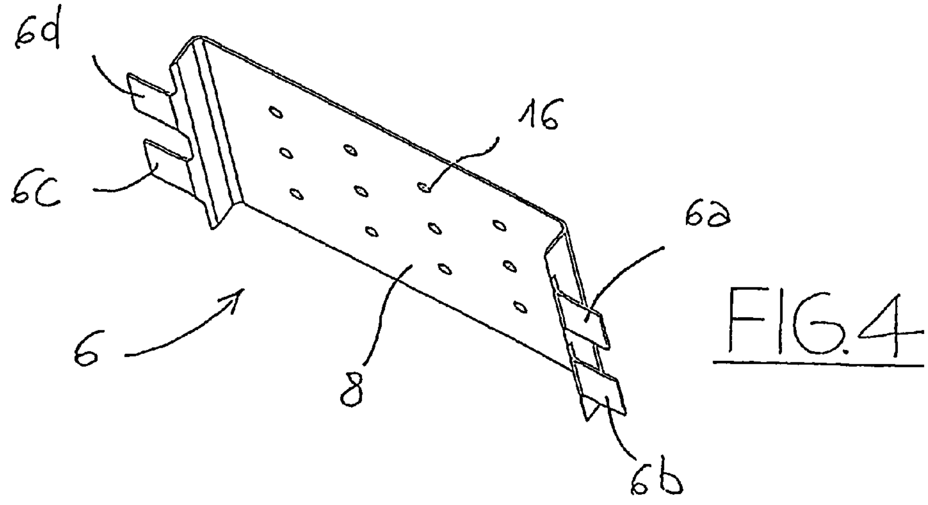
Figure 5:
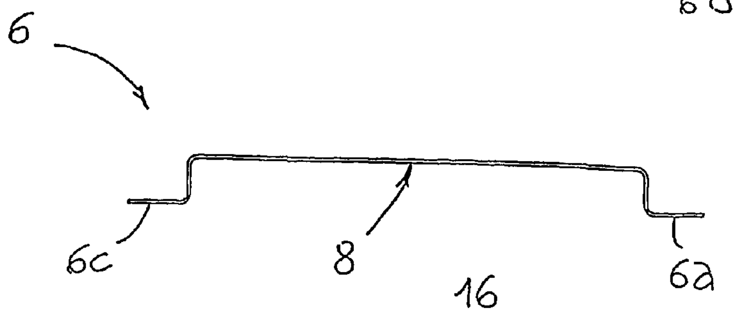
FIGS. 5 and 6 respectively show a profile and a top view of the plate like element shown in FIGS. 3 and 4.
Figure 6:
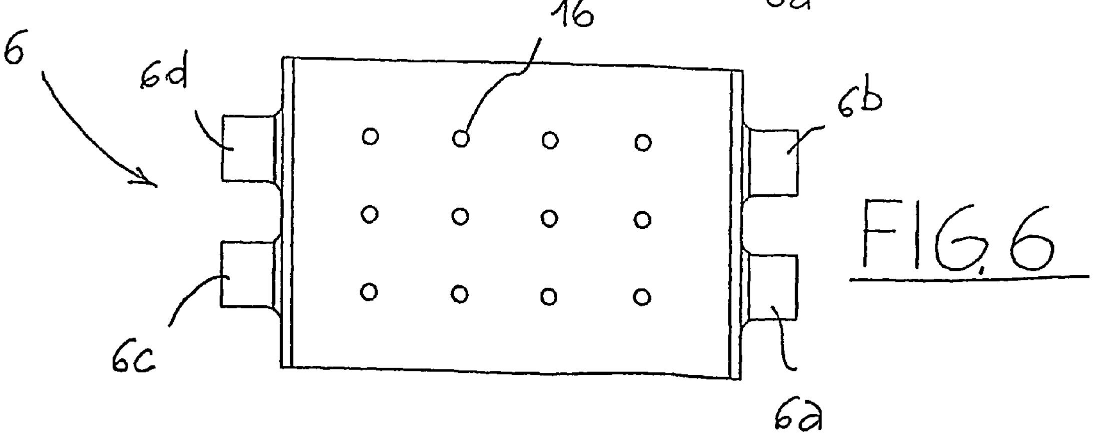

With particular reference to FIG. 1, the transfer roller of the invention is globally designated by the number 1 and it is of the aspirating type.

The roller 1 is provided with a plurality of pairs of pads 20, 21 projecting relative to a lateral surface 1*a* of the roller 1 and whereon lie the edges of a label (not shown).

On each of said edges is laid a strip of glue by means of tangential contact between the pads 20, 21 and a glue roller 3.

The label is then transferred onto a container 4, which is brought into contact with the transfer roller preferably by means of a carrousel 30.

To avoid annoying interference (and possibly breakage) between the glue roller and the pads, the latter are preferably dampened by means of a dampening means 5 interposed between a surface 22, 23 not in view of each pad 20, 21 and a structural portion 1*b* of the roller 1. In the preferred embodiment, said insert is made of sponge-like or polymeric material.

Originally, at least a portion of the lateral surface 1*a* of the roller 1 lying between any pair of pads 20, 21 is elastically deformable.

With particular reference to FIGS. 2 through 6, the elastically deformable lateral surface is entirely defined by at least a plate like element 6, flexible and preferably made of harmonic steel.

The plate-element 6 preferably has four connecting portions which are inserted into corresponding openings present on each pad 20, 21. In the preferred embodiment, the connecting portions are constituted by tabs 6*a*, 6*b*, 6*c*, 6*d* so shaped as to be inserted into corresponding slots 7 present on each pad 20, 21.

In the illustrated example, between a surface 8 not in view of the plate-like element 6 and a structural portion 1*b* of the roller 1 is interposed a dampening insert 9, preferably made of sponge-like material and having a predetermined elastic response according to the applied loads.

With particular reference to FIGS. 3 through 6, the plate-like element 6 has a plurality of through holes 16, to allow the aspiration of a label. Each pad 20, 21 has a dovetailed coupling 20*a*, 21*a*, so shaped as to be coupled to corresponding seats 10 obtained on the roller 1.

At least a pad of each pair of pads 20, 21 whereon are positioned the edges of a label is held in position by a stop element 11 removably fastened on the roller and defining at least a portion 10*a* of one of said seats 10.

In the preferred embodiment, the stop element 11 is removably fastened to the roller 1 by means of a mechanical connection, for instance by means of a screw.

The present invention further relates to a method for removing an elastically deformable plate-like element 6, of the type present between a pair of pads 20, 21 and defining a lateral surface 1*b* of a transfer roller 1, originally comprising the following steps:

- removing a stop element 11 for a pad 21 associated to the roller 1;
- sliding the pad 21 along a lateral development of the roller 1, to disengage it from a seat 10 obtained on the roller itself;
- disengaging first connecting portions 6*a*, 6*b* of the plate-like element 6 from corresponding openings 7 present on the removed pad 21;
- disengaging second connecting portions 6*c*, 6*d* of the plate-like element 6 from corresponding openings 7 present on a second pad 20;
- removing the plate-like element, now free.

The present invention also relates to a method for mounting an elastically deformable plate-like element 6, of the type present between a pair of pads 20, 21 and defining a lateral surface 1*b* of a transfer roller 1, originally comprising the following steps:

- removing a stop element 11 for a pad 21 associated to the roller;
- sliding the pad 21 along a lateral development of the roller, to disengage it from a seat 10 obtained on the roller itself;
- inserting second connecting portions 6*c*, 6*d* of the plate-like element into corresponding openings 7 present on a second pad 20 fastened on the roller;
- inserting first connecting portions 6*a*, 6*b* of the plate-like element into corresponding openings 7 present on the removed pad 21;
- reinserting the removed pad 21 into the corresponding seat 10 present on the roller;
- fastening the stop element 11 to the roller.

The operation of the invention is as follows.

The transfer roller 1 receives the label already cut starting from a film, unwound from a reel, not shown.

The label is kept in contact with the lateral surface of the transfer roller by suction. Specifically, the label is laid on the plate-like element 6 present between a pair of pads 20, 21, in such a way that the edges of the label whereon glue is to be applied are positioned in correspondence with the pads. In this way, since the pads project relative to the lateral surface of the roller, the edges of the label come in contact with the glue roller 3.

Subsequently, the roller 1 transfers the label on the container 4 by means of tangential contact between the container and the lateral surface of the roller. The presence of the plate-like element 6 prevents any deformations of the container 4 and consequently prevents stresses, capable of compromising the integrity of the container, from developing on the container.

The transfer of the label from the roller 1 to the container 4 is made possible by the modulation of the aspiration and by the simultaneous sliding of the label relative to the plate-like element 6.

The invention achieves important advantages.

First of all, a transfer roller according to the present invention can be used to label containers made of glass, or other fragile material, and having poor dimensional tolerances.

In particular, a roller of the type described in the present invention allows to prevent any mechanical deformation of the containers to be labelled and hence it is clearly indicated for glass containers but also for tin cans. Any interference between the transfer roller and the container, which could generate excessive stresses on the container, are elastically absorbed by the plate-like element 6.

Another advantage is that the plate-like element, being made of harmonic steel, has high flexibility, a significant resistance to wear, and guarantees and adequate sliding of the label during its transfer from the roller to the container.

A further advantage is that the presence of connecting portions of the plate-like element in the form of tabs allows to obtain simple slots on the pads, instead of larger openings. In addition to assuring an effective connection, this assures a high mechanical strength of the pads, since it does not weaken its structure.

Yet another advantage is given by the presence of the dampening insert 9 interposed between a structural portion of the roller 1 and a surface not in view of the platelike element 6. Said insert, being made of sponge-like material, allows the passage of the air necessary to operate the aspiration and simultaneously assures an adequate elastic response of the plate-like element 6, when it is subjected to the loads; moreover, said insert has a high resistance to the detergents used to clean the roller.

Advantageously, such a transfer roller allows the labelling machine to operate independently of the quality of the containers being processed, i.e. independently from the dimensional tolerances of said containers, especially if they are glass bottles, for which working tolerances are always very poor.

An additional specific advantage is given by the simplicity of removal/mounting of the plate-like element 6 from/on the transfer roller 1, as is readily apparent from the steps of the method of the invention.

The invention claimed is:

1. An aspirating roller for transferring labels, comprising at least a pair of pads projecting relative to a lateral surface of the roller, at least a portion of the lateral surface of the roller between the pads is elastically deformable, said elastically deformable lateral surface is defined by at least a plate element, characterised in that the plate element has connecting portions which are inserted into corresponding openings present on each pad.

2. A roller as claimed in claim 1, characterised in that it comprises at least a dampening insert interposed between a surface not in view of the plate element and a structural portion of the roller.

3. A roller as claimed in claim 2, characterised in that the dampening insert is made of sponge.

4. A roller as claimed in claim 1, characterised in that each pad has a dovetailed coupling so shaped as to be coupled with corresponding seats obtained on the roller.

5. A roller as claimed in claim 4, characterised in that it comprises at least a stop element removably fastened to the roller and defining at least a portion of one of said seats, to maintain in position a pad during the operation of the roller to allow its possible removal when the roller is in resting condition.

6. A roller as claimed in claim 5, characterised in that the stop element is removably fastened to the roller by means of a mechanical connection.

7. A roller as claimed in claim 6, characterised in that the mechanical connection is constituted by at least a screw.

8. A roller as claimed in claim 1, characterised in that it comprises at least a dampening insert interposed between a surface not in view of each pad and a structural portion of the roller.

9. A roller as claimed in claim 1, characterised in that the connecting portions comprise a plurality of tabs so shaped as to be inserted into corresponding slots present on each pad.

10. A roller as claimed in claim 1, characterised in that the plate element has a plurality of holes to allow the aspiration of a label.

11. A roller as claimed in claim 1, characterised in that the plate element is flexible and made of harmonic steel.

* * * * *